(12) United States Patent
Mishra et al.

(10) Patent No.: US 8,951,491 B2
(45) Date of Patent: Feb. 10, 2015

(54) PROCESS FOR THE ADSORPTION OF TOXIC SULPHUR BEARING GASES

(71) Applicant: Council of Scientific & Industrial Research, New Delhi (IN)

(72) Inventors: Mridusmita Mishra, Jorhat (IN); Rajib Lochan Goswamee, Jorhat (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 14/147,246

(22) Filed: Jan. 3, 2014

(65) Prior Publication Data

US 2014/0186248 A1    Jul. 3, 2014

(30) Foreign Application Priority Data

Jan. 3, 2013   (IN) ................ 16/DEL/2013

(51) Int. Cl.
| | | |
|---|---|---|
| *B01D 53/48* | (2006.01) | |
| *B01D 53/50* | (2006.01) | |
| *B01D 53/52* | (2006.01) | |

(52) U.S. Cl.
CPC .............. *B01D 53/508* (2013.01); *B01D 53/52* (2013.01)
USPC ................. 423/230; 423/244.01; 423/244.02; 423/244.06; 423/244.07; 423/244.09; 423/244.1

(58) Field of Classification Search
USPC .................. 423/230, 244.01, 244.02, 244.06, 423/244.07, 244.09, 244.1
See application file for complete search history.

(56) References Cited

U.S. PATENT DOCUMENTS

| | | |
|---|---|---|
| 1,938,672 A | 12/1933 | Ruthruff |
| 3,539,306 A | 11/1970 | Kumura et al. |
| 3,796,792 A | 3/1974 | Shigeo et al. |
| 3,879,523 A | 4/1975 | Miyata et al. |
| 4,003,823 A | 1/1977 | Baird, Jr. et al. |
| 4,007,109 A | 2/1977 | Baird, Jr. et al. |
| 4,087,348 A | 5/1978 | Baird, Jr. et al. |
| 4,087,349 A | 5/1978 | Baird, Jr. |
| 4,119,528 A | 10/1978 | Baird, Jr. et al. |
| 4,127,470 A | 11/1978 | Baird, Jr. et al. |
| 4,263,020 A | 4/1981 | Eberly, Jr. |

(Continued)

OTHER PUBLICATIONS

F. Cavani, F. Trifirb, A.Vaccari, "Hydrotalcite-Type Anionic Clays: Preparation, Properties and Applications" vol. 11, No. 2, pp. 173-301 (1991).

*Primary Examiner* — Timothy Vanoy
(74) *Attorney, Agent, or Firm* — Maschoff Brennan (57) ABSTRACT

The preparation of nano-oxide coated adsorbent, which is useful for treatment of toxic gases, by coating of composite materials containing hydrotalcite over ceramic monolithic substrates. Oxides and salts of metals are reacted in a known manner to prepare hydrotalcites or mixed metal layered hydroxides such as Mg—Al, Ca—Al, Zn—Al, Zn—Cr type possessing positive layer charge, from which a stable gel is prepared by adding swellable clay, e.g., montmorillonite etc. in different hydrotalcite:clay ratio in an aqueous medium and homogenizing the same with high speed homogenizer and ultrasonicator in a high intensity ultrasonic processor. The gel is dip-coated over cordierite/mulite honey-comb monolithic supports. The dip-coated monoliths are dried and calcined to develop the alumino-silicate supported nano-oxide coats over honey-comb ceramic substrates for carrying out adsorption of $H_2S$ and $SO_2$ gas in a He flow in various flow rates at 400 to 1000° C. temperature in a cylindrical quartz tube.

7 Claims, 4 Drawing Sheets

(56) References Cited

U.S. PATENT DOCUMENTS

| | | |
|---|---|---|
| 4,454,244 A | 6/1984 | Woltermann |
| 4,665,044 A | 5/1987 | Pinnavaia et al. |
| 4,666,877 A | 5/1987 | Vaughan |
| 5,116,587 A * | 5/1992 | Pinnavaia et al. ........ 423/244.02 |
| 5,326,734 A | 7/1994 | Vaughan |
| 5,785,938 A * | 7/1998 | Pinnavaia et al. ........ 423/244.01 |
| 5,928,496 A * | 7/1999 | Albers et al. .................. 208/113 |
| 5,935,420 A | 8/1999 | Baird, Jr. et al. |
| 6,338,831 B1 * | 1/2002 | Strehlau et al. .......... 423/244.07 |
| 6,419,890 B1 | 7/2002 | Li |
| 6,923,945 B2 | 8/2005 | Chen |
| 8,211,395 B2 * | 7/2012 | Sanchez Valente et al. ........................ 423/244.06 |
| 2011/0014103 A1 * | 1/2011 | Macleod et al. .............. 423/230 |
| 2011/0014105 A1 * | 1/2011 | Potter et al. .............. 423/244.02 |

* cited by examiner

PROCESS FOR THE ADSORPTION OF TOXIC SULPHUR BEARING GASES

CROSS-REFERENCE

This patent application claims priority to India patent application Number 16/DEL/2013 filed Jan. 3, 2013.

FIELD OF THE INVENTION

The present invention relates to a process for the absorption of toxic sulfur bearing gases using supported mixed metal oxidic nano sheets coated ceramic monolithic reactor.

BACKGROUND AND PRIOR ART OF THE INVENTION

Reference may be made to previous works on different adsorbent materials such as alloys of molten metals like sodium/lead (U.S. Pat. No. 1,938,672), alkali or alkaline earth metal hydroxides (U.S. Pat. No. 4,003,823), alkali metal oxide based adsorbent (U.S. Pat. No. 4,007,109), potassium sulphide based adsorbent (U.S. Pat. No. 4,119,528), metal aluminate based adsorbents (U.S. Pat. No. 4,263,020), alkali metal alkoxide (U.S. Pat. No. 4,087,349). Various derivatives of hydrotalcite also referred to as LDH or layered double hydroxides exhibit high hydrogen sulfide sorption. Specific examples include $Mg_{4.8}Al_{1.2}(OH)_{12}Cl_{1.2}$, $Zn_4Cr_2(OH)_{12}Cl_2$, $Zn_4Al_2(OH)_{12}Cl_2$, and may include numerous modified and unmodified synthetic and mineral analogs of these as described in U.S. Pat. Nos. 3,539,306, 3,796,792, 3,879,523, and 4454244, and as reviewed by Cavani et al. in Catalysis Today, Vol. 11, No. 2, pp. 173-301 (1991).

Some particularly active hydrogen sulfide sorbents are $ZnSi_2O_5$ gel, $ZnFe_2(OH)_{12}Cl_2$, and the Fe containing clay like nontronite. Several Mg—Al hydrotalcites with crystallite size less than about 300 Angstroms also showed preference for hydrogen sulphide sorption (Bhattacharyya et al. Ind. Eng. Chem. Res. 1988, 27, 1356-1360). Pillared-smectites, kandites, LDHs (Layered Double Hydroxides) and silicic acids in which the layers are pillared by oxides of Fe, Cr, Ni, Co, Zn oxides in combination with alumina, as demonstrated by, but not limited to, U.S. Pat. Nos. 4,666,877, 5,326,734, 4,665,044/5 and Brindley et al, Clays and Clay Minerals, 26, 21 (1978) and Amer. Mineral, 64, 830 (1979) show very good hydrogen sulphide adsorption property.

Another method of desulphurization is use of molten dispersions of alkali metal alloys such as sodium/lead. Wherein sodium reacts with $H_2S$ to form $Na_2S$ (U.S. Pat. No. 1,938,672). However, this method has the disadvantage of difficult catalyst regenerability and the relatively low desulfurization ability etc.

Especially those hydrogen sulfide sorbents are preferred which are regenerable, representative of such sorbents are zeolitic materials, spinels, meso- and microporous transition metal oxides (U.S. Pat. No. 5,935,420). As described in the said patent adsorbents are prepared by impregnating metal salts over solid surfaces and finally converting the salts to oxides and making some extrudes out of these supported powders. The oxide and support combinations described are ZnO on alumina, CuO on silica, ZnO/CuO on kieselguhr and the like. Reagents useful for the regeneration of these types of hydrogen sulfide sorbents are air (oxygen), steam, hydrogen etc. This method of desulfurisation suffers from low reactivity of active adsorbent species present inside the body of the extruded pellets. Additionally, due to overheating there is formation of core sintering in such extruded pellets leading to further reactivity loss.

In all of these experiments adsorption of $H_2S$ is carried out at temperatures at around 500° C. and no special preparation of the particulate zinc alumina spinel or other adsorbents in nano dimension level is done thus effective adsorption in these systems is not maximum.

In all of these papers or patents the adsorption experiments were carried out by using either micron level powders or millimeter level pellets as adsorbents. In both of these forms, adsorbents had their own distinct disadvantages e.g. powder form of adsorbents give rise to high pressure drop and pellets on the other hand give rise to core sintering due to temperature gradient between the surface and the center. The coated honeycomb monolithic adsorbents used in the present invention do not possess such disadvantages. Indeed the pressure drop across the small unitary parallel passages of honeycomb type ceramic monoliths is two to three times smaller than the same in a collection of spherical pellets of equivalent area.

Reference may be made about the use of coated honeycomb type monolithic catalyst containing a synthetic mineral called hydrotalcite or layered double hydroxides (U.S. Pat. Nos. 3,796,792 and 3,879,523) as one of the coating component for the following U.S. Pat. Nos. 6,923,945 and 6,419,890. In the U.S. Pat. No. 6,923,945 hydrotalcite has been added with other inorganic components like alumina, zirconia, rare earth oxides and platinum metals etc. and applied as a coat to trap $SO_x$ so that actual 'Three Way Catalyst' containing the noble metals is not destroyed. In the second patent (U.S. Pat. No. 6,419,890) also hydrotalcites were added in the form of wash coatings over ceramic honeycombs to alleviate decrease of activity of 'Three Way Catalyst'. It is to be noted here in none of these catalysts hydrotalcite particles are disaggregated to their individual sheet levels by taking course to any physical or chemical route or they were dispersed and coated as thin films over any favourably structured solid surface.

In the U.S. Pat. No. 1,938,672 alkali metal lumps of sodium, potassium or lithium were used in the fused state for desulphurization of hydrocarbon oils and lower boiling point hydrocarbons. This process thus uses costly metals and as well as removes sulphurous contaminants from liquid states only. In comparison to it the present process uses cheaper solid phase metal oxides in its exfoliated nano sheet form supported and coated as thin films over suitable structural supports.

In an another method reported in literature desulphurization was achieved through contact of sulphur bearing petroleum feedstocks with alkali or alkaline earth metal oxides/hydroxides in presence of hydrogen at high temperatures and pressure forming some alkali sulphides or hydrosulphides and finally the adsorbents were regenerated by reacting the adsorbents with steam at high temperature or oxidizing them to alkali metal sulphides in presence of activated carbon or in presence of magnesium oxide (U.S. Pat. No. 4,003,823). Here also to prepare the adsorbents, no particle particle electrostatic interaction between two layered or non layered materials was taken recourse to.

Another reported process for desulphurization and hydro conversion of heavy hydrocarbon feeds including various sulphur containing heavy petroleum oils is by contacting the feedstocks with potassium sulphide in a conversion zone maintained at elevated temperatures in presence of added hydrogen (U.S. Pat. No. 4,119,528). Similarly in another US patent (U.S. Pat. No. 4,007,109) a method has been described about desulphurization of petroleum feedstock by contacting the process steam with alkali metal oxides. In another US patent (U.S. Pat. No. 4,087,348) a method has been described about desulphurization of petroleum feedstock by contacting the process steam with alkali metal oxides, alkaline earth metal hydrides in presence of hydrogen at elevated temperatures. The alkaline earth metal sulfide salts can be regenerated to form alkaline earth metal hydrides or oxides.

In an another US patent (U.S. Pat. No. 4,087,349) a method has been described about simultaneous hydroconversion and desulphurization of petroleum feedstock by the reaction of feed with an alkali metal alkoxide in the presence of added hydrogen at elevated temperatures.

These processes thus are not basically for gaseous inorganic sulphur bearing compounds like $SO_2$ or $H_2S$ formed during combustion or hydrogenation of hydrocarbons, as well as these processes need hydrogen as an additional reactant. The present process on the other hand can work in absence of hydrogen as well as in inert and air atmosphere.

Similarly, in an another US patent (U.S. Pat. No. 4,263,020) a method has been described about desulphurization of petroleum feedstock by contacting the process steam with particulate metal aluminates $MAl_2O_4$. The sulphur bearing compounds are adsorbed, desorbed and removed from the said particulate mass of metal alumina spinel by contacting and purging the same with a relatively clean gas stream suitably hydrogen, hydrogen containing gas or inert gas at elevated temperatures. Thus, this process also involves use of aggregated particulate adsorbents which possess the inherent problems of pressure drop, differential heat distribution between its surface and the core etc.

In an another US patent (U.S. Pat. No. 4,127,470) a method has been described about simultaneous hydroconversion and desulphurization of petroleum feedstock by the reaction of feed with binary combinations of reactive alkaline oxide/alkaline earth metal oxide or hydroxide, where the alkaline earth metal component is relatively reactive than alkaline metal oxide component. These desulfurization catalysts were then also supported over materials like coke, charcoal, alumina, silica, barium carbonate, barium sulphide, calcium oxide, calcium carbonate and like which provide a well dispersed supported reagent. The catalyst also claims that there is no relationship between different ratios of reactants in the adsorbent and may be varied considerably. In comparison to this process in the present process of patent application the desulphurisation adsorbents are coated over honeycomb monolithic supports having channeled geometry suitable for laminar flow of gases at high temperature in both oxidative and non-oxidative environment with minimum pressure drop in the system.

References may be made to patent application 3597DEL2012, wherein mixed metal oxidic nano sheets coated monolithic catalyst and preparation thereof is reported for the decomposition of toxic $N_2O$. In the above referred invention a process for the preparation of nano-oxide coated catalysts useful for the treatment of toxic $N_2O$ gas by coating of composite materials containing LDHs over ceramic monolithic substrates is provided. The process combines reacting oxides and salts of metals in a known manner so as to prepare LDHs or mixed metal layered hydroxides such as Ni—Al, Mg—Al, Zn—Cr—Al type possessing positive layer charge, from which a stable gel is prepared by adding swellable clay having a negative charge e.g. montmorillonite, laponite, hectorite etc. in different LDH:clay ratio in an aqueous medium and homogenising the same with high speed homogeniser and ultrasonicator in a high intensity ultrasonic processor. The gel is then dip-coated over cordierite/mulite honey-comb monolithic supports at various dipping and withdrawal rates. The dip-coated monoliths are then dried and calcined at different temperatures to develop the alumino-silicate supported nano-oxide coats over honey-comb ceramic substrates for carrying out decomposition of $N_2O$ gas in a He flow in various flow rates at 400 to 600° C. temperature in a cylindrical quartz tube.

The use of hydrotalcite-clay composites to form supported oxides suitable for adsorption of toxic gases like H2S and SO2 have been patented by Goswamee et al. (Indian patent No 235052). In comparison to the same the present process is still a novel approach as it involves formation of thin coats of supported oxides by dip-coating them over ceramic honey-comb substrates, which apart from other advantages like increased activity due to nano dimensionality, supported projection, layered morphology, tunable metal ion composition etc. also would eventually lead to development of certain device to control air pollution by fixing it in the tail end of exhaust pipes of emission sources.

OBJECTIVES OF THE INVENTION

The main objective of the present invention is to provide a process for the absorption of toxic sulfur bearing gases using supported mixed metal oxidic nano sheets coated ceramic monolithic reactor.

Another objective of the present invention is to provide a process for the absorption of $SO_2$ or $H_2S$ gas at high temperatures by using an efficient and adsorbent device which is cheap, composed of environmentally benign constituents, free from problems like pressure drop and core sintering generally encountered in catalyst beds of pellets and powders used in different processes.

Yet another objective of the present invention is to develop novel coats of layered nano oxidic sheets supported over and as well as projected outwards from a carpet like support layer of alumino silicate particles derived from swelling clays spread over both external surface and internal channels of ceramic honey-comb monoliths so that over all reactivity of the adsorbent is many times high.

Yet another objective of the present invention is to have a mechanism of varying the content of active material in the final coats in the products and it is achieved by changing the dip coating parameters as well as the flow property of the gelled suspension.

Still another objective of the present invention is to develop thin crack free green coats derived from novel thixotropic aqueous gels of hydrotalcite and swelling clay like montmorillonite composites at appropriate ratios of the components so that the green coats on subsequent drying, calcination and other process treatments stick to the walls of monolithic support and do not scale out in the form of dried curly xerogels.

Still another objective of the present invention is to develop a device having compliance to the one of the principles of Green Chemistry i.e. maximize the atom economy by increasing the efficiency of products, processes and systems by designing for maximization of mass, energy, space, and time efficiency.

Yet another objective of the present invention is to develop a rugged device containing nano-oxidic adsorbent particles derived from hydrotalcites suitable to be incorporated in a stationary as well as moving source of $SO_2$ or $H_2S$ gas so that the problem of global warming and consequent mandatory challenge of developing suitable technology under the broad dictum of Kyoto Protocol is effectively attended to.

SUMMARY OF THE INVENTION

Accordingly, present invention provides a process for the adsorption of toxic sulphur bearing gases using mixed metal oxidic nano sheets coated ceramic monolithic absorbent and the said process comprising the steps of:

i. providing mixed metal oxidic nano sheets coated ceramic monolithic absorbent by known method;

ii. passing toxic sulphur bearing gases over the absorbent as provided in step (i) at a flow rate of 5 to 50 ml/min at a space velocity in the range of 4.51 to 1628 $hr^{-1}$ for period in the range of 20 minutes to 3 hours to remove 98.8 to 99.9% toxic gases.

In an embodiment of the present invention, toxic sulphur bearing gases are selected from $SO_2$ or $H_2S$ along with He, Ar or $N_2$ or combination thereof.

In an another embodiment of the present invention, adsorption of $SO_2$ is carried out at a temperature in the range of 600-850° C.

In yet another embodiment of the present invention, adsorption of $H_2S$ is carried out at a temperature in the range of 400-600° C.

In yet another embodiment of the present invention, the said starting oxides after adsorption of toxic gases are regenerated after heat treatment at moderately high temperature in the range of 500 to 1000° C. in presence of air and steam.

In still another embodiment of the present invention, reaction area, length and diameter of cylindrical quartz reactor is in the range of 20-80 $cm^3$, 10-60 cm and 2-3 cm respectively.

In still another embodiment of the present invention, Specific Desulphurisation Efficiency (SDE) is in the range of 21,000 to 62,438, where SDE is the percentage desulphurization per weight of the active adsorbent component present in the composite (%/g).

BRIEF DESCRIPTION OF THE DRAWINGS

FIG. 2-(I) shows a comparison of $SO_2$ desulphurisation ability of Ca—Al hydrotalcite alone, its composite in powdered form as well as in the form of thin films coated over solid honeycomb in terms Specific Desulphurization Efficiencies (SDE) where Specific Desulphurisation Efficiency (SDE) was calculated by dividing the percentage decrease of concentration toxic sulphur bearing gas with the amount of oxidic material present in the composite as active desulphurization component). Specific Desulphurisation Efficiencies (SDE) vs Type of adsorbent used—

A—SDE of the powdered composite adsorbent [calcined LDH (layered double hydroxides)+clay] at 1000° C. (SDE—1106);
B—SDE of the active component of the powdered adsorbent at 1000° C. (SDE—3875);
C—SDE of the composite coat in monolithic reactor at 700° C. (SDE—7725);
D—SDE of the active LDH component of the composite coat in monolithic reactor at 700° C. (SDE—27035);
E—SDE of the composite coat in monolithic reactor at 850° C. (SDE—7659);
F—SDE of the active LDH component of the composite coat in monolithic reactor at 850° C. (SDE—26802);
G—SDE of the active LDH component of the composite coat in monolithic reactor at 1000° C. (SDE—26916).

FIG. 2-(II) shows comparison of $H_2S$ desulphurisation ability of calcined Zn—Al hydrotalcite- of the Zn—Al hydrotalcite, hydrotalcite component in the composite powder, composite of Zn—Al hydrotalcite+clay, active material Zn—Al hydrotalcite present in coat over monolith, composite material Zn—Al hydrotalcite+clay at 500° C. Specific Desulfurisation Efficiencies (SDE) vs Type of adsorbent used—

A—SDE of the Zn—Al hydrotalcite powder at 500° C. (SDE—1412);
B—SDE of the composite of Zn—Al hydrotalcite+clay at 500° C. (SDE—994);
C—SDE of the hydrotalcite component in the composite powder at 500° C. (SDE—3313);
D—SDE of the composite material Zn—Al hydrotalcite+clay at 500° C. (SDE—18280);
E—SDE of the active material Zn—Al hydrotalcite present in coat over monolith at 500° C. (SDE—62438).

FIG. 3 shows stacked powder XRD pattern of the composite of clay & Ca—Al hydrotalcite (I) & Ca—Al hydrotalcite (II) after $SO_2$ adsorption {A'—$CaAl_2(SiO_4)_2$-PDF-002-0523, A—$CaSO_4$-PDF-055-0954, B'—$CaSO_4.H_2O$-PDF-002-0667, B—$Ca(SO)_4$-PDF-072-0503, C—$CaSO_4$-PDF-055-0953, D—$CaSO_4$-PDF-073-3957, E—$CaSO_4$-PDF-043-0606, F—$CaSO_4$-PDF-044-0515} (PDF=Powder Diffraction File of Joint Committee on Powder Diffraction Standards, USA).

FIG. 4 shows powder XRD pattern of the calcined composite of clay & Mg—Al hydrotalcite or layered double hydroxide before (I) and after $SO_2$ adsorption (II) as well as after regeneration of the adsorbent (III) {A—MgO (PDF 045-0946), B—$MgSO_4$ (PDF-012-0017), C—$MgSO_4.H_2O$ (033-0802), D—$MgSO_4.7H_2O$-(036-0419)}.

DETAIL DESCRIPTION OF THE INVENTION

Present invention provides a process for the absorption of toxic sulfur bearing gases using supported mixed metal oxidic nano sheets coated ceramic monolithic reactor.

Oxides and salts of metals react in a known manner so as to prepare hydrotalcites or mixed metal layered hydroxides such as Ca—Al, Mg—Al, Zn—Al, Zn—Cr type possessing positive layer charge; preparing a stable gel by adding swellable clay having a negative charge such as montmorillonite, laponite, hectorite etc. in the hydrotalcite:clay ratio of 0.2:1 to 1:0.2% (w/w) respectively in an aqueous medium and homogenising the same with high speed homogeniser at 8000-14000 RPM for five to fifteen minutes; further dispersing under ultrasonication by using 0.5 or 1 inch titanium horn in a high intensity ultrasonic processor at above 15 kHz frequency of 20 to 40% amplitude for 3-10 minutes with 1.5-4.5 s pulse on and 1.0-2.0 s pulse off mode with a total spell of sonication for 0.5 to 3.5 hours over a period of 4 to 10 days with an approximate 5 to 24 hours gap between each spell; dip-coating the prepared gels over cordierite/mulite honey-comb monolithic supports of 250 to 400 Channels Per Square Inch (CPSI) at both dipping and withdrawal rates of 1-20 mm/min; drying the dip-coated monoliths at 80-160° C. and calcining the dried coated monoliths at 350 to 450° C. to develop the alumino-silicate supported nano-oxide coats over honey-comb ceramic substrates; adsorption study of $SO_2$ and $H_2S$ premixed gas in a He flow at a flow rate of 5 to 50 ml/min at 400 to 1000° C. temperature in a cylindrical quartz reactor with a reaction area of 20-80 cm$^3$, length 10-60 cm and diameter 2-3 cm respectively.

Figure 1:
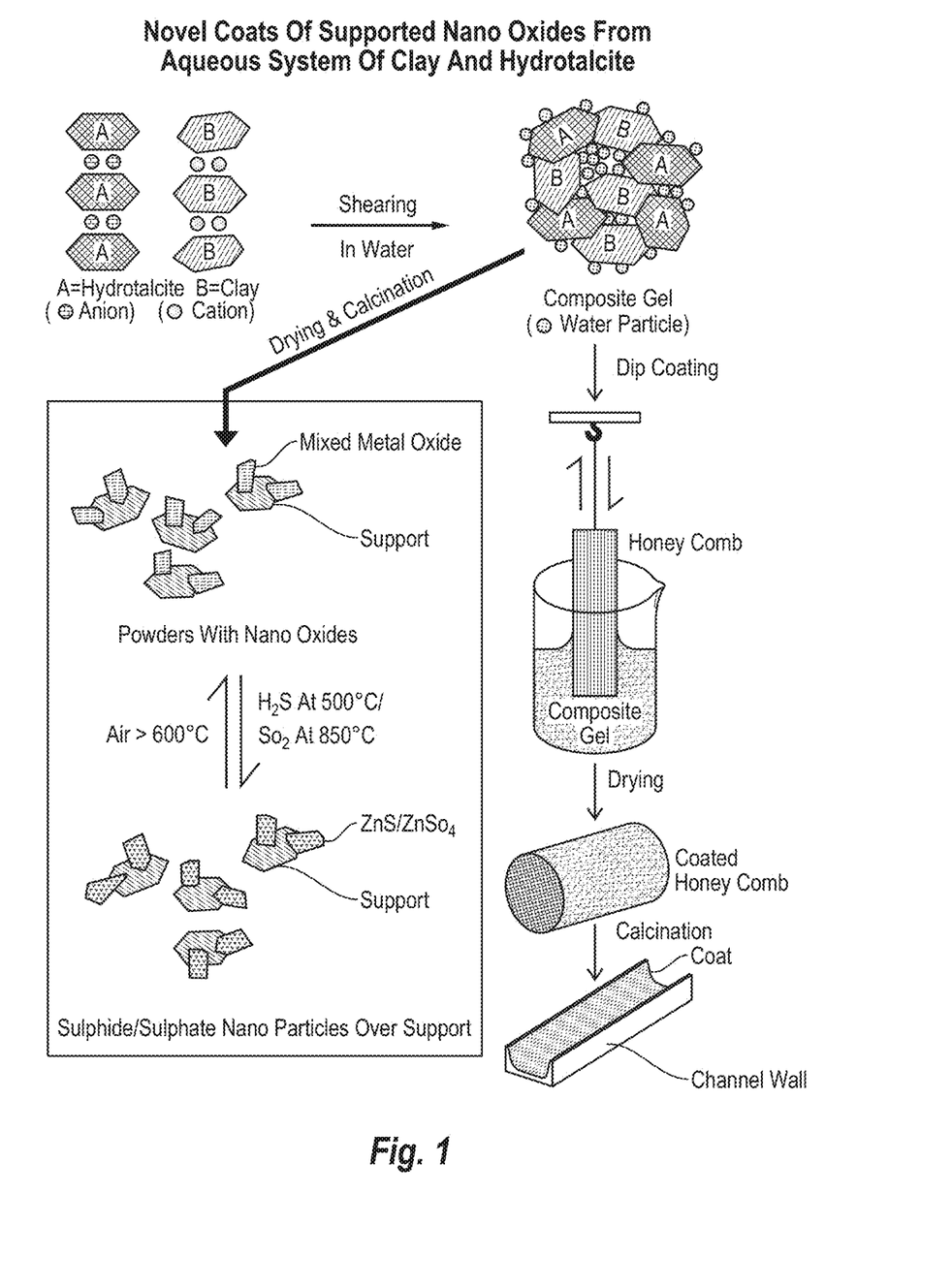
FIG. 1 shows the scheme of exfoliation of hydrotalcite sheets by interaction with clay and its consequent coating in the form of active nano oxides over honeycomb surfaces.
Figure 5:
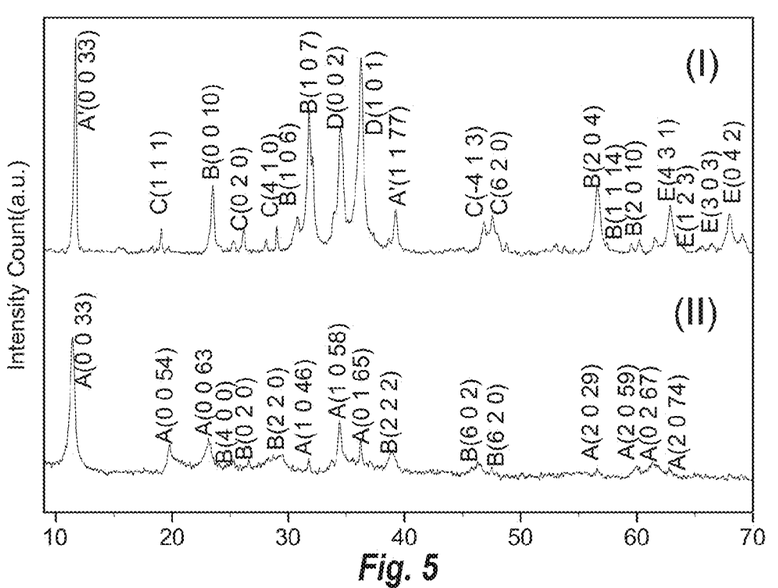
FIG. 5 shows stacked powder XRD pattern of the (I)-Zn—Al hydrotalcite after $H_2S$ adsorption, (II)-Composite of Na-Mont+Zn—Al hydrotalcite after $H_2S$ adsorption A—ZnS-089-2153, A'—ZnS-089-2154, B—$Zn_3O(SO_4)_2$-032-1476, B'—ZnS-089-2155, C—$Zn_3O(SO_4)_2$-089-2155, D—ZnO-005-0664, E—$ZnSO_4$-008-0491.

Hydrotalcite particles exfoliate into individual nano sheets by using a special type of particle-particle interaction between the edges of negatively charged smectites with positively charged basal faces of hydrotalcites to form stable gels where hydrotalcite particles are dispersed in the form of nano sheets in the body of the gel (FIG. 1). This gel is then coated over solid supports to form thin films containing exfoliated hydrotalcite sheets of specific metal ion combinations which are then thermally converted to mixed metal oxidic nano sheets to form the active adsorbent species. As the present patent is based upon this remarkable gelation property of hydrotalcite and swelling clay composites it ultimately paves the way for various positive advantages viz. the swelling clay component acting as a thin film producing ingredient upon which nano dimensional active metal oxides of suitable bi and trivalent combination having layered morphology are supported out in the form of billboards on the gas pathways, the extremely good non-Newtonian flow behaviour of composite gels help in preparing reproducible green coats of desired thickness over suitable ceramic matrix by dip-coating, exfoliation of hydrotalcite aggregated layers to individual nano-sheets during gel formation stage etc.

Specifically, in comparison to earlier patent of Goswamee et al. (Indian patent No 235052) the present process is mainly based on structurising the adsorbents in the form of thin coats over honeycomb monolithic supports which enhances the percentage desulphurization ability of the active ingredients several thousand times than that of the powdered composite adsorbents. Thereby complying to the one of the principles of Green Chemistry i.e. maximize the atom economy by increasing the efficiency of products, processes and systems by designing for maximization of mass, energy, space and time efficiency.

In the present invention initially a stable gel is prepared containing hydrotalcite and clays. Hydrotalcites as such do not form stable gels in aqueous medium as they are crystalline substances. In presence of hydrotalcites the normal gelation behaviour of swelling clays is enhanced by several times. The enhancement is due to positive negative electrostatic interaction between positively charged hydrotalcite surface and negatively charged montmorillonite edges and surfaces, which together forms a 'house-of-card' structure. Water molecules are entrapped within these cards forming the stable gel. Such stability gives the opportunity to coat the gels over solid ceramic supports more particularly ceramic honey-comb monoliths. On calcination the two different components of the gel forming the green wet coat is decomposed to two different constituents first the clay component which decomposes to some layered alumino-silicate oxides upon which the oxidic nano sheets derived from hydrotalcites is distributed forming an effective coat of well dispersed high surface area active oxide particles having high potential for adsorptive desulphurisation and adsorption of toxic gases. The adsorptive potential of the oxides is further enhanced many times by the monolithic shape of the complete set-up which permits a stable laminar flow of the gases through the system. Similar approach to preparation of monolithic hydrotalcite coated catalysts for environmental or other catalytic applications by taking advantage of gelation behaviour of two oppositely charged inorganic solids namely hydrotalcites and swelling clays have not been made. The present approach takes advantage of gel forming nature of the said composites, which helps in dip-coating the gel over ceramic monolithic pre-form. The same otherwise is not possible as crystalline hydrotalcites do not form gels as such. Apart from this, the clay component helps in supporting the nano-sized oxidic particles derived from hydrotalcite precursors over an alumino-silicate type coat over the channels of honeycombs.

Following examples are given by way of illustration and therefore should not be construed to limit the scope of the present invention.

EXAMPLE 1

Preparation of Mg—Al Hydrotalcite, its composite and desulphurization study by composite powder as disclosed in Indian Patent IN 235052. 188.32 g (0.502 M) of Al $(NO_3)_3 \cdot 9H_2O$ and 230.79 g (0.9 M) of $Mg(NO_3)_2 \cdot 6H_2O$ were dissolved in 700 cm$^3$ water. A mixture of 280 cm$^3$ of 12.5 M NaOH solution and 1000 cm$^3$ of 1 M $Na_2CO_3$ solution was added in drops over a period of 4 hours under stirring condition maintaining a pH of 9.5. The slurry was rolled in a roller oven for 24 hours at 65° C. The product was filtered, washed to make free of sodium ion and dried at 103° C. for 24 hours in an air oven to obtain dried Mg—Al hydrotalcite (Mixed metal layered hydroxide (MMLH) or Layered Double Hydroxide (LDH)). The dried MMLH (5 g) was then mixed thoroughly with 5 g of montmorillonite clay (M/S LOBA Chemie, India) for 70 minutes in a mortar. The dry mix was then homogenised in 300 ml water, in a Hamilton beach mixture for about fifteen minutes at 14000 rpm. The homogenised slurry was then kept for hydration for about 7 days after which it was dried in an air oven at 110° C.; the dried mass was then gradually calcined in an electric furnace at 500° C. for 30 minutes. Cooling was done slowly to obtain active MgO particles projected up from the surface of clay matrix.

1 g of MMLH-clay calcined powder (<150 μm size) was placed in an alumina boat length 8 cm, width 3 cm and depth 2 cm in a silica glass tube of 4 cm inside diameter and 90 cm length. The two ends of the tube were fixed with outlet and inlet tubes in a leak-proof manner with the help of rubber stoppers. The tube was placed inside a cylindrical furnace. The composite were treated thermally at 750° C. for 5 hours with air and nitrogen, firstly with air for 3 hours and then with $N_2$ for 2 hours. The temperature of the composite was decreased under $N_2$ flow from 750 to 700° C. The composite was reacted with a mixture of $SO_2$ and air at 700° C. under a flow rate of $SO_2$~25 ml min$^{-1}$ and air 10 ml min$^{-1}$ and subsequently the temperature of the substance was decreased to 300° C. under $SO_2$ flow. Ultimately the composite was cooled down to room temperature i.e. at 25° C. under $N_2$ atmosphere. XRD evaluation of the product showed formation of well crystallised $MgSO_4$ {PDF no 74-13641}.

EXAMPLE 2

Preparation of Alumino-Silicate Supported Nano-Oxide Coats Over Honey-Comb Ceramic Substrates The overall process for preparation of Ca—Al hydrotalcite was kept almost similar to other procedures of hydrotalcite synthesis at alkaline pH as described in Indian Patent IN 235052 and Indian patent application No. 3597DEL2012. Ca—Al hydrotalcites were prepared by taking 100 ml distilled water in a reactor. To this additional 25 ml 0.1 M NaOH was added. The pH of the solution was raised to 10. The reactor was heated to 50° C. and kept the temperature constant. Stoichiometric amount (38.16 g) of $Na_2CO_3$ in 300 ml distilled water and 250 ml salt mixture of stoichiometric (43.37 g) amount of $CaCl_2.6H_2O$ and (15.94 g) $AlCl_3.6H_2O$ were kept on adding slowly maintaining the pH of the solution 9.0. The slurry obtained was stirred for 4.0 hours. The content was then aged at 75° C. for 24 hrs. The product was finally washed with distilled water, dried in air oven and kept in plastic bottle. The product was characterized by XRD in powder diffractometer, which gave pattern typical of layered structure with high intensity (001) peaks at regular interval of d-spacings along with specific peaks for other hkl reflections. Similarly, thermal characterization of the synthesized products was also carried out by DTA-TGA at different heating rates under different atmospheres.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homo-ionisation was carried out by treating the clay with 1N aqueous NaCl in room temperature i.e. at 27° C. under sonication for 100 minutes at different periods extending over a span of one week with one-inch (25 mm) solid probe titanium horn in a high intensity ultrasonic processor model VCX 500 (from M/S Sonics and Materials Inc, USA). The treated clay were then dialysed in a dialysis bag (from M/S Sigma Chemicals Co., USA) in distilled water for several weeks and constantly changing the water and monitoring the conductivity till the Na content in the dialysed water was below 5 ppm.

Stable gels of montmorillonite clay-Ca—Al hydrotalcite system in different hydrotalcite-clay ratios were prepared from aqueous suspensions of 0.075:0.5, or 4.35:4.35 or 0.6:0.75% (w/v) by homogenising the same with high speed homogeniser at 10,000 RPM for 10 minutes under ultrasonication by using 1 inch titanium horn in a high intensity ultrasonic processor at above 15 kHz frequency of 33% amplitude for 5 minutes with 1.5-4.5 second pulse on and 1.0-2.0 second pulse off mode and 1 inch (25 mm) solid titanium horn with a total spell of sonication for 0.5 to 3.5 hours over a period of 4 to 10 days with an approximate 5 to 24 hours gap between each spell.

Figure 6A:
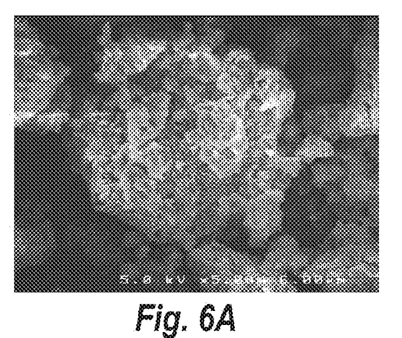
FIG. 6 shows SEM images of coats of composites over honeycomb surfaces (A) cluster of metal nanosheets (B) edge view.
Figure 6B:
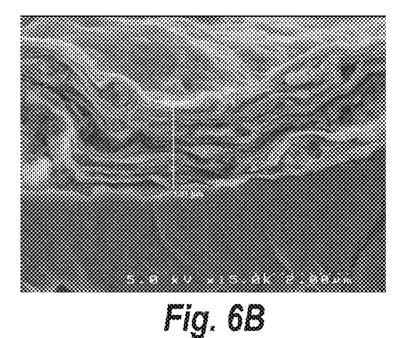

A portion of the prepared gel were then dried and calcined to form powders. The powders were characterised by XRD, SEM-EDXA. XRD patterns showed presence of CaO phase, while SEM (FIG. 6) patterns gave alumino-silicate powders from clay precursors over which CaO particles are present in the form of cluster having well distributed metal nanosheets of 80 nm dimension.

The different stable gels of montmorillonite clay-Ca—Al hydrotalcite were then dip-coated above honeycomb Cordierite supports of 400 Channels Per Square Inch (CPSI) at a dipping rate of 20 mm/min and withdrawal rate of 20 mm/min using a KSV Model DC dip coater; drying the dip-coated monoliths at 80° C. and calcining the dried coated monoliths at 550° C. to develop the alumino-silicate supported nano-oxide coats over honey-comb ceramic substrates.

EXAMPLE 3

Alumino-Silicate Supported Nano-Oxide Coats Over Honey-Comb Ceramic Substrates

The overall process for preparation of Mg—Al hydrotalcite was kept almost similar to other procedures of hydrotalcite synthesis at alkaline pH as described in Indian Patent IN 235052 and Indian patent application No. 3597DEL2012.

Mg—Al hydrotalcites were prepared by taking 100 ml distilled water in a reactor. To this additional 25 ml 0.1 M NaOH was added. The pH of the solution was raised to 10. The reactor was heated to 50° C. and kept the temperature constant. Stoichiometric amount (38.16 g) of $Na_2CO_3$ in 300 ml distilled water and 250 ml salt mixture of stoichiometric amount (40.25 g) of $MgCl_2.6H_2O$ and (15.94 g) $AlCl_3.6H_2O$ were kept on adding slowly maintaining the pH of the solution 9.5. The slurry obtained was stirred for three hours. The content was then aged at 75° C. for 24 hours. The product was finally washed with distilled water, dried in air oven and kept in plastic bottle. The product was characterized by XRD in powder diffractometer, which gave pattern typical of layered structure with high intensity (001) peaks at regular interval of d-spacings along with specific peaks for other hkl reflections. Similarly, thermal characterization of the synthesized product was also carried out by DTA-TGA at different heating rates under different atmospheres.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homo-ionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc, USA). The treated clay were then dialyzed in a dialysis bag (from M/S Sigma Chemicals Co., USA) in distilled water for several weeks and constantly changing the water and monitoring the conductivity till the Na content in the dialyzed water was below 5 ppm.

Stable gels of montmorillonite clay-Mg—Al hydrotalcite system in different hydrotalcite-clay ratios were prepared from aqueous suspensions of 0.075:0.5, or 4.35:4.35 or 0.6:0.75% (w/v) by homogenising the same with high speed homogeniser at 8000-14000 RPM for five to fifteen minutes under ultrasonication by using 1 inch titanium horn in a high intensity ultrasonic processor at above 15 kHz frequency of 33% amplitude for 5 minutes with 1.5-4.5 second pulse on and 1.0-2.0 second pulse off mode and 1 inch (25 mm) solid titanium horn with a total spell of sonication for 0.5 to 3.5 hours over a period of 4 to 10 days with an approximate 5 to 24 hours gap between each spell.

Figure 7:
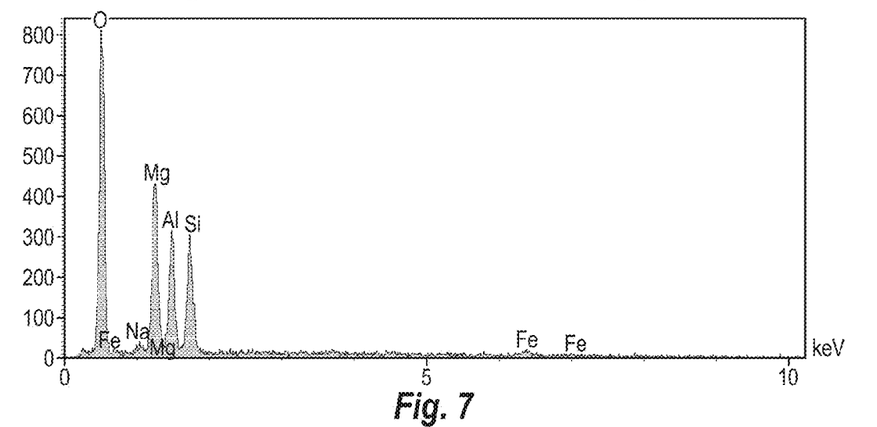
FIG. 7 shows EDXA (Energy Dispersive X-Ray Analysis) pattern of coats of composites over honeycomb surfaces surface view.

The prepared gel was then dip-coated above honeycomb Cordierite supports of 400 Channels Per Square Inch (CPSI) at a dipping rate of 20 mm/min and withdrawal rate of 20 mm/min using a KSV Model DC dip coater; drying the dip-coated monoliths at 80° C. and calcining the dried coated monoliths at 550° C. to develop the alumino-silicate supported nano-oxide coats over honey-comb ceramic substrates. The EDXA (FIG. 7) patterns showed presence of Magnesium, Silicon, Oxygen, Aluminium & Sodium as shown by Electron Dispersed X-Ray Analysis.

EXAMPLE 4

Alumino-Silicate Supported Nano-Oxide Coats Over Honey-Comb Ceramic Substrates

The overall process for preparation of Zn—Al hydrotalcite was kept almost similar to other procedures of hydrotalcite synthesis at alkaline pH as described in Indian Patent IN 235052 and Indian patent application No. 3597DEL2012.

Zn—Al hydrotalcites were prepared by taking 100 ml distilled water in a reactor. To this additional 25 ml 0.1 M NaOH was added. The pH of the solution was raised to 10. The reactor was heated to 50° C. and kept the temperature constant. Stoichiometric amount (38.16 g) of $Na_2CO_3$ in 300 ml distilled water and 250 ml salt mixture of stoichiometric amount (41.47 g) of $ZnCl_2.6H_2O$ and (15.94 g) $AlCl_3.6H_2O$ were kept on adding slowly maintaining the pH of the solution 9.5. The slurry obtained was stirred for 3 hours. The content was then aged at 75° C. for 24 hours. The product was finally washed with distilled water, dried in air oven and kept in plastic bottle. The product was characterized by XRD in powder diffractometer.

Purification of commercial grade montmorillonite obtained from M/S ONGCL (India) was done by separating the non-clay i.e. <2 μm equivalent spherical diameter fraction by sedimentation technique. The suspension obtained was dried to powdered state. The organic matter present in it has been destroyed by boiling the separated fraction with $H_2O_2$. Further purification of the clay in the form of homo-ionisation was carried out by treating the clay with 1N aqueous NaCl in room temperature under sonication for 100 minutes at different periods extending over a span of one week with one-inch (25 mm) solid probe titanium horn in a high intensity ultrasonic processor model VCX 500 (from M/S Sonics and Materials Inc., USA). The treated clay were then dialyzed in a dialysis bag (from M/S Sigma Chemicals Co., USA) in distilled water for several weeks and constantly changing the water and monitoring the conductivity till the Na content in the dialyzed water was below 5 ppm.

Stable gels of montmorillonite clay-Zn—Al hydrotalcite system in different hydrotalcite-clay ratios were prepared from aqueous suspensions of 0.075:0.5, or 4.35:4.35 or 0.6: 0.75% (w/v) by homogenising the same with high speed homogeniser at 8000-14000 RPM for five to fifteen minutes under ultrasonication by using 1 inch titanium horn in a high intensity ultrasonic processor at above 15 kHz frequency of 33% amplitude for 5 minutes with 1.5-4.5 s pulse on and 1.0-2.0 s pulse off mode and 1 inch (25 mm) solid titanium horn with a total spell of sonication for 0.5 to 3.5 hrs over a period of 4 to 10 days with an approximate 5 to 24 hours gap between each spell.

The prepared gel was then dip-coated above honeycomb Cordierite supports of 400 Channels Per Square Inch (CPSI) at a dipping rate of 20 mm/min and withdrawal rate of 20 mm/min; drying the dip-coated monoliths at 80° C. and calcining the dried coated monoliths at 550° C. to develop the alumino-silicate supported nano-oxide coats over honeycomb ceramic substrates.

EXAMPLE 5

The coated honeycomb ceramics as prepared in example 2 were placed in some quartz tube and the two ends of the tube were fixed with outlet and inlet tubes in a leak-proof manner with the help of rubber stoppers. The tube was placed inside a cylindrical furnace. The catalyst were treated thermally at 750° C. for 5 hours with air and nitrogen, firstly with air for 3 hours and then with $N_2$ for 2 hours. The temperature of the composite was decreased under $N_2$ flow from 750 to 700° C. The composite was reacted with a mixture of $SO_2$ and air at 700° C. under a flow rate of $SO_2$ ~25 ml $min^{-1}$ and air 10 ml $min^{-1}$ and subsequently the temperature of the substance was decreased to 300° C. under $SO_2$ flow. The $SO_2$ levels in reactant gas and in the product were determined by using Porapak Q as separating column with FPD & FID detector in GC. Calibration of GC was done from a premixed calibration standard containing $SO_2$, $N_2$ and $O_2$ at standard ppm with Helium as balance.

EXAMPLE 6

Adsorption study was carried out by using a premixed $SO_2$ gas (1157 ppm, in Helium) and using different catalysts like calcined and uncalcined clay, hydrotalcite and clay-hydrotalcite composite powders as well as monoliths. Experiments carried out shows that upto 98.8% adsorption of $SO_2$ premixed in Helium (1012 ppm) at 850° C. at a space velocity of 5 $hr^{-1}$ using Mg—Al hydrotalcite-montmorillonite coated over honeycomb supports as prepared in example 3 can be obtained. The products of catalytic decomposition were studied by using Porapak Q as separating column with FPD & FID detector in GC. Calibration of GC was done from a premixed calibration standard containing $SO_2$, $N_2$ and $O_2$ at standard ppm with Helium as balance.

EXAMPLE 7

Adsorption study was carried out by using a premixed $H_2S$ gas (990 ppm, in Helium) and using different catalysts like calcined and uncalcined clay, hydrotalcite and clay-hydrotalcite composite powders as well as monoliths. Experiments carried out shows that upto 99.9% adsorption of $H_2S$ at 500° C. at a space velocity of 5 $hr^{-1}$ using Zn—Al hydrotalcite-montmorillonite coated over honeycomb supports as prepared in example 4 can be obtained. The products of catalytic decomposition were studied by using Porapak Q as separating column with FPD in GC. Calibration of GC was done from a premixed calibration standard containing $H_2S$, $N_2$ and $O_2$ at standard ppm with Helium as balance.

COMPARATIVE EXAMPLE 1

TABLE 1 shows Specific Desulphurization Efficiency (SDE, %/g) of $SO_2$ and $H_2S$ absorption using mixed metal oxidic nano sheets coated ceramic monolithic absorbent

| Catalyst | Specific Desulphurization Efficiency (SDE, %/g) | |
|---|---|---|
| | $SO_2$ Absorption | $H_2S$ Absorption |
| EXAMPLE 1 | 26,802 | 39,326 |
| EXAMPLE 2 | 21,438 | 40,483 |
| EXAMPLE 3 | 23,230 | 62,438 |
| Catalyst (IN 235052) | 3,875 | 3,313 |

ADVANTAGES OF THE INVENTION

1. The present invention provides a process for the removal of sulphur bearing toxic gases like $SO_2$, $H_2S$ using mixed metal oxidic nano sheets laid or supported over alumino silicate grains in the channels of honeycomb monolithic reactors like billboards in a road side, which in turn offer high atom efficient adsorption at high temperature per gram of adsorbent used.
2. The process provides an efficient adsorption device which is cheap as it is free from costly components like noble metals or rare earth metal oxides rather it is composed of environmentally benign cheap reusable oxidic constituents capable of adsorption of toxic $SO_2$ and $H_2S$ gas reversibly.

3. The present invention provides a rugged device containing nano-oxidic adsorbent particles derived from LDHs suitable to be incorporated in a stationary as well as moving source of $SO_2$ and $H_2S$ gas so that the problem of desulphurising the $SO_2$ content from the flue gas produced on hydrocarbon combustion and desulphurising $H_2S$ content at high temperature during hot gas desulphurization of coal e.g. high organic sulphur bearing Assam coal, is effectively attended to.

The invention claimed is:

1. A process for the adsorption of toxic sulphur bearing gases using mixed metal oxidic nano sheets coated ceramic monolithic absorbent and the said process comprising the steps of:
   i. providing mixed metal oxidic nano sheets coated ceramic monolithic absorbent by known method;
   ii. passing toxic sulphur bearing gases over the absorbent as provided in step (i) at a flow rate of 5 to 50 ml/min at a space velocity in the range of 4.51 to 1628 hr$^{-1}$ for period in the range of 20 minutes to 3 hours to remove 98.8 to 99.9% toxic gases.

2. The process as claimed in claim 1, wherein toxic sulphur bearing gases are selected from $SO_2$ or $H_2S$ along with, He, Ar or $N_2$ or combination thereof.

3. The process as claimed in claim 1, wherein adsorption of $SO_2$ is carried out at a temperature in the range of 600-850° C.

4. The process as claimed in claim 1, wherein adsorption of $H_2S$ is carried out at a temperature in the range of 400-600° C.

5. The process as claimed in claim 1, wherein the said starting oxides after adsorption of toxic gases are regenerated after heat treatment at moderately high temperature in the range of 500 to 1000° C. in presence of air and steam.

6. The process as claimed in claim 1, wherein reaction area, length and diameter of cylindrical quartz reactor is in the range of 20-80 cm$^3$, 10-60 cm and 2-3 cm respectively.

7. The process as claimed in claim 1, wherein Specific Desulphurisation Efficiency (SDE) is in the range of 21,000 to 62,438, where SDE is the percentage desulphurization per weight of the active adsorbent component present in the composite (%/g).

* * * * *